Figure 2A:
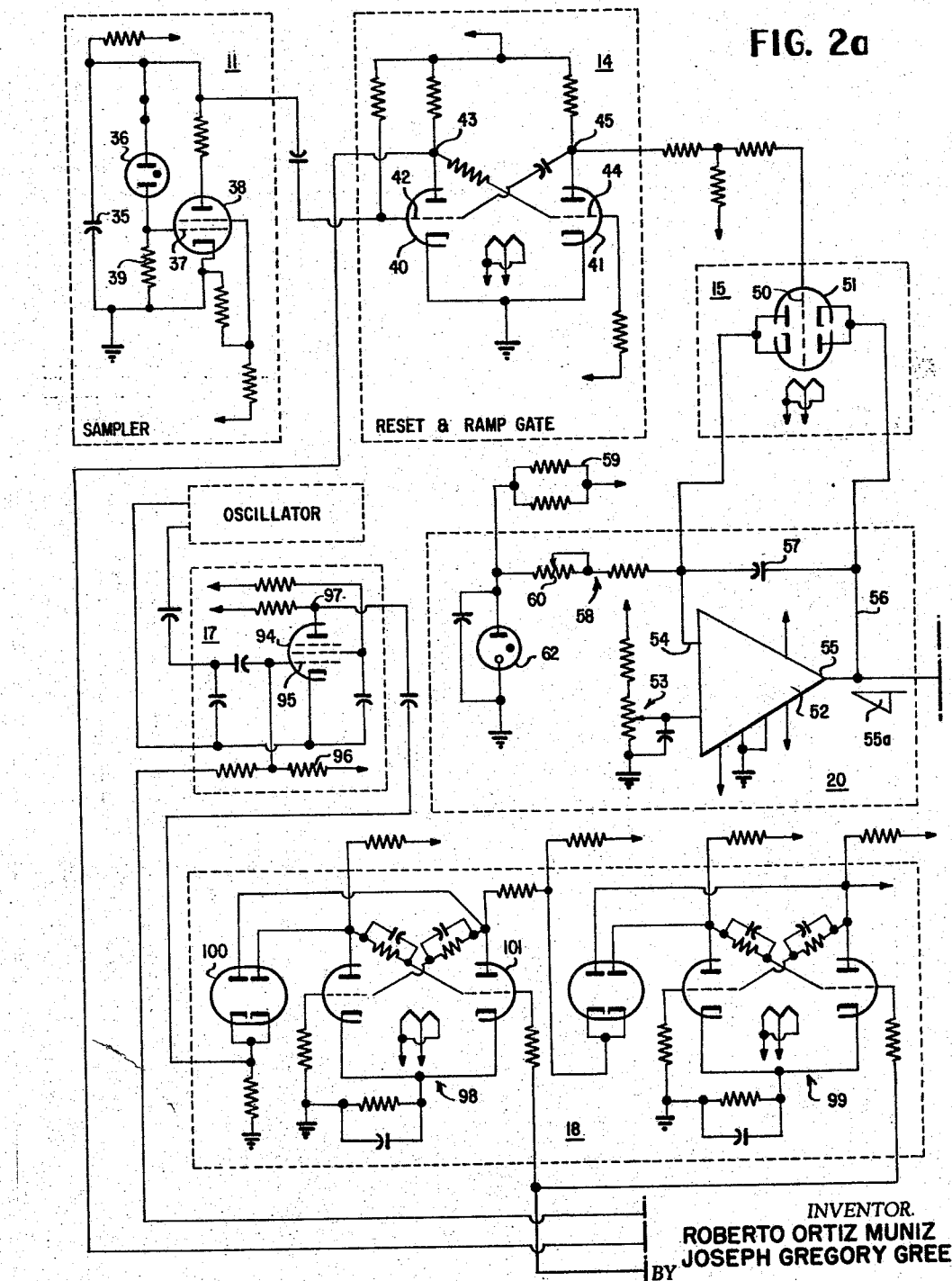

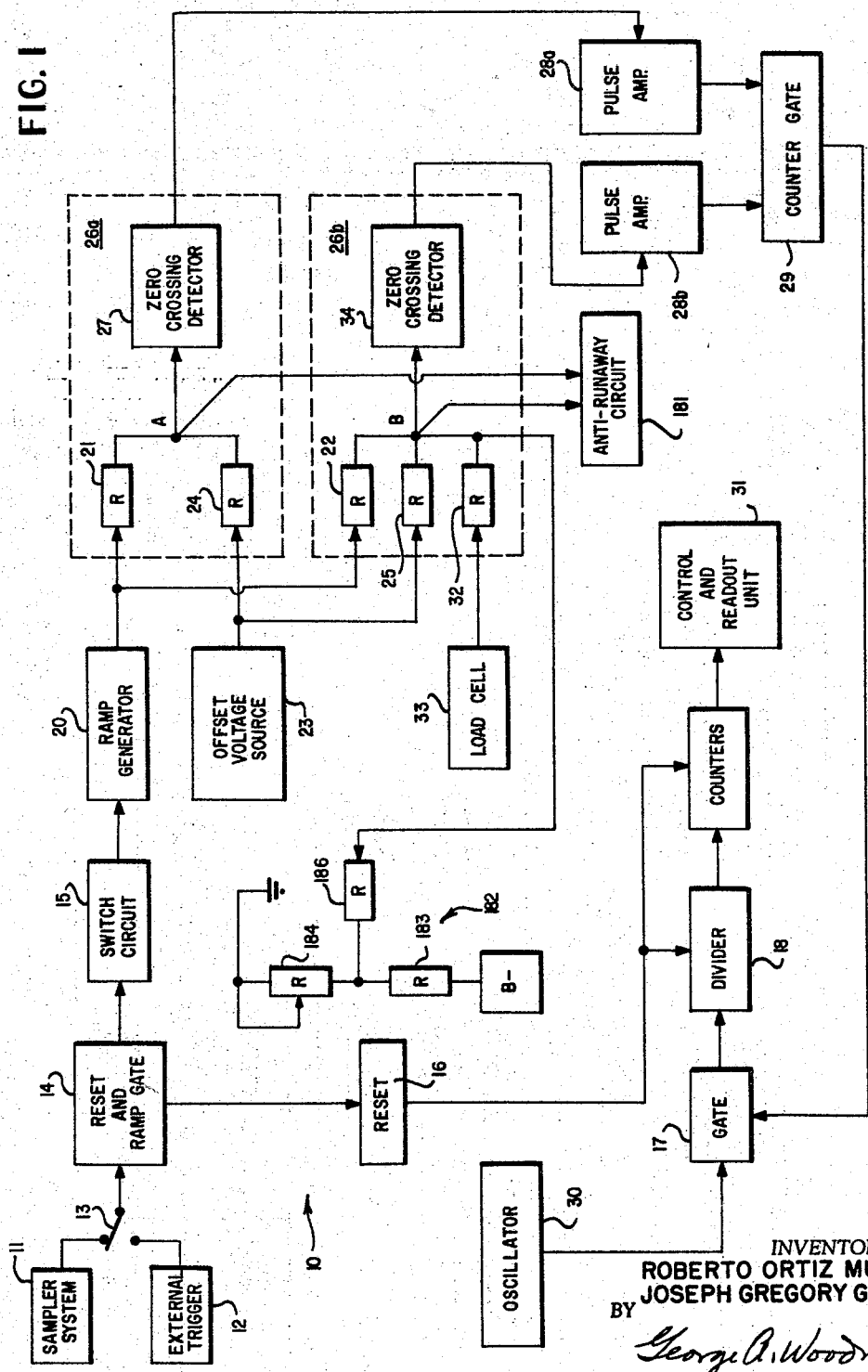

INVENTOR.
ROBERTO ORTIZ MUNIZ
JOSEPH GREGORY GREEN
ATTORNEY

INVENTOR.
ROBERTO ORTIZ MUNIZ
JOSEPH GREGORY GREEN
BY
ATTORNEY

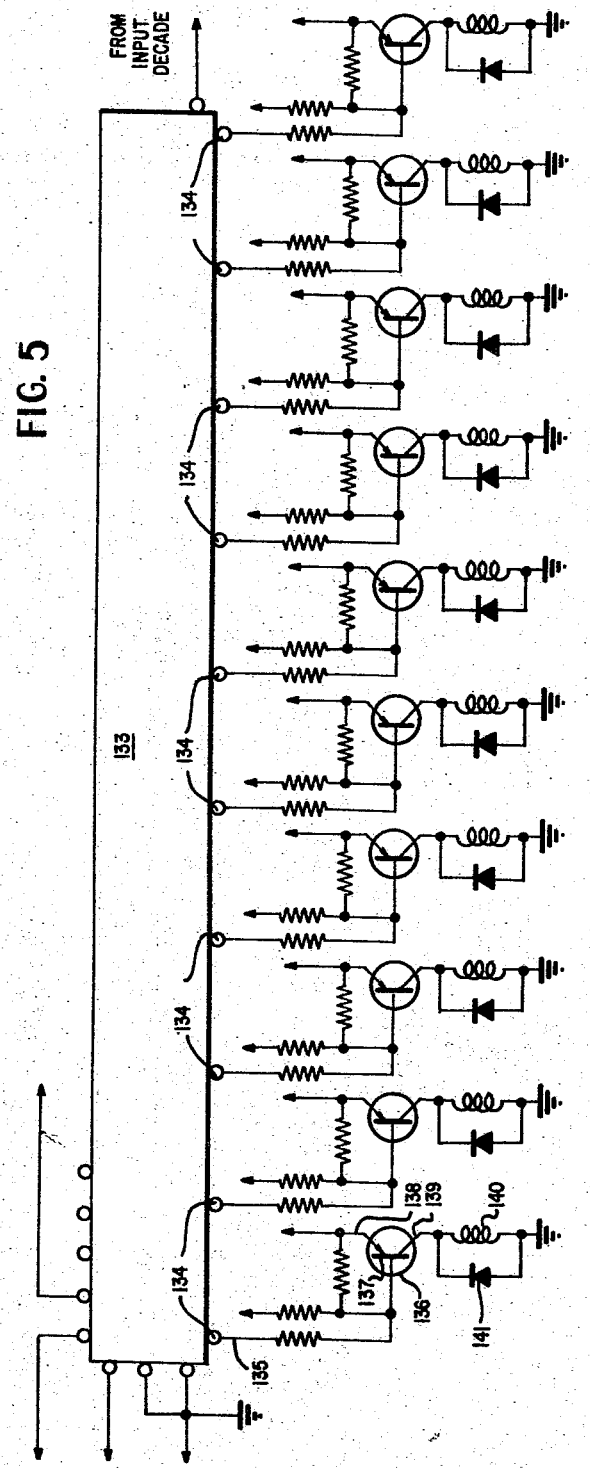
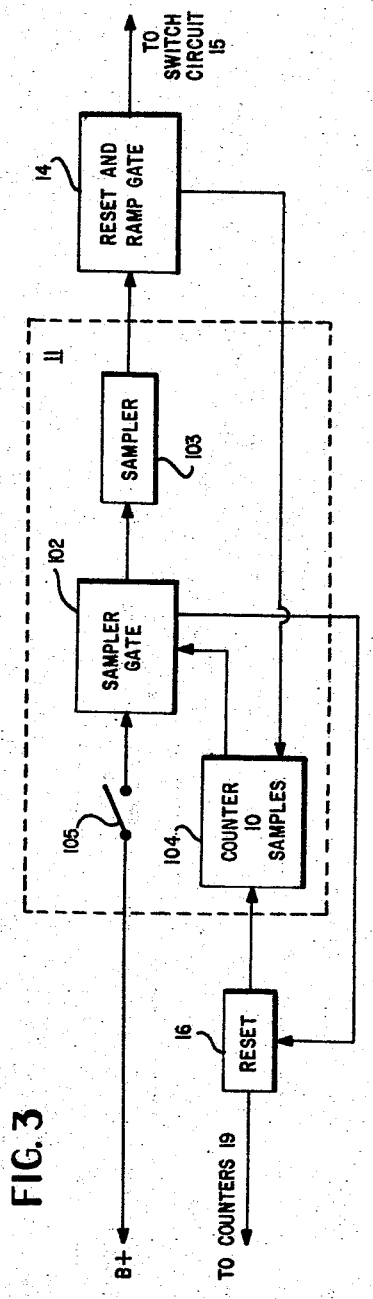
FIG. 5
FIG. 3
INVENTOR.
ROBERTO ORTIZ MUNIZ
JOSEPH GREGORY GREEN
BY
ATTORNEY June 28, 1966   R. O. MUNIZ ETAL   3,258,764
VOLTAGE MEASURING AND CONVERSION SYSTEM
Filed Aug. 28, 1962   6 Sheets-Sheet 6

INVENTOR.
ROBERTO ORTIZ MUNIZ
JOSEPH GREGORY GREEN
BY
*George A. Woodruff*
ATTORNEY

United States Patent Office 3,258,764
Patented June 28, 1966

3,258,764
VOLTAGE MEASURING AND CONVERSION SYSTEM
Roberto Ortiz Muniz, Mayaguez, Puerto Rico, and Joseph Gregory Green, Beloit, Wis., assignors, by mesne assignments, to Fairbanks Morse Inc., New York, N.Y., a corporation of Delaware
Filed Aug. 28, 1962, Ser. No. 220,088
27 Claims. (Cl. 340—347)

This invention relates generally to voltage measuring and conversion systems, and more particularly to an improved analog voltage measuring and conversion system having a high speed conversion capability which is particularly adapted for force measuring applications.

Recent advances in the development of electronic voltage measuring equipment and techniques have given rise to an ever increasing demand for improved electronic conversion equipment which may be readily utilized for various computer, measuring, or indicating systems to provide an accurate electronic repesentation of an unknown voltage function. Several recently developed measuring systems have advantageously employed an analog to digital conversion system for providing a digital indication representative of the magnitude of an unknown analog signal. In many of these applications, it is of utmost importance that the analog to digital conversion function be rapidly performed so that an indication may be obtained almost instantaneously with the application of the analog input signal.

One of the many fields wherein the utilization of analog to digital conversion systems has been found feasible is the force measuring field. The development of force measuring techniques incorporating the employment of improved load cell components for converting a load or weight function into a representative analog voltage signal, such as in electronic weighing scale applications, has given rise to a need for a high speed measuring and conversion system to convert an analog signal representative of an unknown force into a digital indication. It is obvious that where an electronic weighing scale is employed, it is of prime importance that any conversion and indicating operation be rapidly performed, as the load to be measured may be applied only momentarily to the measuring instrument. In the weighing scale field, if a plurality of loads are to be measured in rapid succession, a delayed indication would prove worthless. Therefore, the requirement that a rapid indication be provided is quite prevalent in all applications wherein an analog to digital conversion system is employed within a measuring and conversion system which is utilized to accomplish a measuring or indicating function.

In an attempt to meet the demand for a rapidly operating measuring and conversion system, analog to digital systems have been developed wherein the unknown analog signal to be measured is compared with a known voltage, while simultaneously, a digital indication is produced upon an indicator. One system of this nature, known to the prior art, includes the utilization of a locally generated ramp voltage having a constant voltage rise per time. This system incorporates a stable oscillator which provides a time base, and pulses from the oscillator are fed to an electronic counter system during the rise of the ramp voltage to obtain a digital indication representative of elapsed time. In operation, the ramp voltage is compared to the unknown analog input voltage. The ramp starts at zero volts and begins to rise at a predetermined rate, and at the instant the ramp starts, the time base oscillator is triggered to furnish pulses to the counters at a predetermined rate per time. When the ramp voltage rises to a value equal to the input analog voltage, the counters are caused to discontinue counting the pulses furnished from the oscillator. Thus, the time required by the ramp voltage to reach the magnitude of the unknown analog voltage may be determined by the number of pulsse received by the pulse counters, and this number is indicative of the magnitude of the unknown analog signal.

Although voltage measuring and conversion units including analog to digital conversion systems employing this ramp voltage principle have been used to some advantage to provide a rather rapid measuring and conversion function, systems of this nature developed by the prior art suffer from deficiencies which act to increase the expended time necessary to obtain an accurate analog to digital conversion function from the system. For example, prior systems utilizing the ramp principle have required that time be expended between the application of the analog signal and the institution of the ramp voltage while a pulse signal is produced to reset the counter unit. This counter resetting process causes unnecessary delay in the institution of the conversion function and the production of the digital output indication.

Also, in prior measuring and conversion systems utilizing the ramp principle, a problem was encountered in attempting to obtain accurate sensing of coincidence between the input analog signal and the locally generated ramp voltage. In these systems, the counter units were activated at the instant that the ramp voltage rise was instituted, and the comparison between the unknown analog voltage and the ramp voltage was initiated at the instant of zero ramp voltage time. However, the stop pulse to terminate the operation of the counters was instituted at a later time when the ramp voltage and the unknown analog voltage were equal in amplitude, and, in prior systems, if, at the instant that the ramp voltage was initiated, the unknown analog voltage was exactly equal to or less than the ramp voltage at zero time, no later stop pulse could be initiated, since no second zero crossing would occur. Therefore, a runaway counter condition was forthcoming. This meant that at the initiation of the ramp voltage when the amplitude thereof was equal to zero, the analog voltage had to be slightly greater than zero, thereby causing an unstable zero indication and possible error in the digital output of the system. Also, the ramp voltage was often produced by a ramp capacitor, which experienced decay voltage variations and small non-linearities at the initial portion of the ramp curve. The institution of the comparison function between the analog input signal and the ramp voltage at the instant that the ramp voltage was initiated subjected the comparison function to these initial non-linearities in the ramp voltage. To eliminate these initial non-linearities, most prior measuring and conversion systems provide means to charge the ramp capacitor to a predetermined voltage, and this charging operation requires that additional time be expended for each conversion cycle.

Additionally, when measuring and conversion units, including analog to digital conversion systems, are utilized for force measuring applications, it is of utmost importance that the output indication be rapidly obtained, but it is also equally important that the output from the unit provide an accurate indication representing the magnitude of the force being measured. Prior measuring and conversion systems have been generally designed to operate under ideal conditions wherein the input analog voltage to the system remains stable throughout the measuring operation. With these prior systems, a fluctuating input analog voltage has given rise to a fluctuating digital output indication. In many force measuring applications, instances will arise wherein an unstable analog voltage is produced by a force sensing system. This may be particularly illustrated by the problems attendant with motion weighing situations wherein a plurality of railroad cars, trucks, or the like, pass rapidly over a weighing platform. The rapid passage of weights over a weighing platform often causes low frequency vibration of the platform to which a load cell responds. The load cell output varies above and below its true value in accordance with this vibration frequency, thereby introducing an error in the analog voltage produced by the load cell. When this varying analog voltage is fed to a measuring and conversion system of the type known to the prior art, an erroneous output indication is normally obtained. The tendency of prior measuring systems to produce an erroneous digital output indication based upon a fluctuating input voltage as often rendered these systems unsuitable for use in force measuring applications.

It is a primary object of this invention to provide an improved measuring conversion system for measuring applications which is capable of performing a rapid voltage conversion function.

Another object of this invention is to provide an improved measuring and conversion system which incorporates a novel ramp voltage comparator system for providing an improved ramp voltage comparison function.

A further object of this invention is to provide an improved measuring and conversion system operating upon the ramp voltage principle wherein the ramp voltage may be instantly initiated upon the application of an analog signal without the provision of a delay for the resetting of a counter unit.

Another object of this invention is to provide an improved measuring and conversion system for measuring applications which incorporates a novel ramp voltage comparator system operating upon an offset zero principle wherein the measuring function is not initiated at the instant the ramp voltage is begun, but may be positioned to occur at any portion of the ramp voltage curve.

A further object of this invention is to provide an improved measuring and conversion system wherein the output digital indication provided is not affected by ramp voltage drift or non-linearities present near the beginning of the ramp voltage curve.

Another object of this invention is to provide an improved measuring and conversion system which includes a novel ramp voltage comparator unit capable of performing plural separate comparisons of the ramp voltage to the analog voltage at two true zero crossing points on the ramp curve, thereby permitting an accurate output indication when the analog voltage is initially equal in value to the ramp voltage and preventing a runaway counter condition when the analog voltage value is less that that of the initial ramp voltage.

A further object of this invention is to provide an improved measuring and conversion system for measuring applications which incorporates a multiple count sampling system to enable the production of a digital output indicative of the average magnitude of a fluctuating analog input voltage.

Another object of this invention is to provide an improved measuring and conversion system which incorporates a multiple count sampling unit combined with an improved digital counter control and readout unit to indicate the average value of a fluctuating input.

A still further object of this invention is to provide an improved measuring and conversion system which may be advantageously incorporated for use with various computer, measuring or indicating applications to provide an accurate and rapid voltage measuring and conversion function.

Figure 2B:
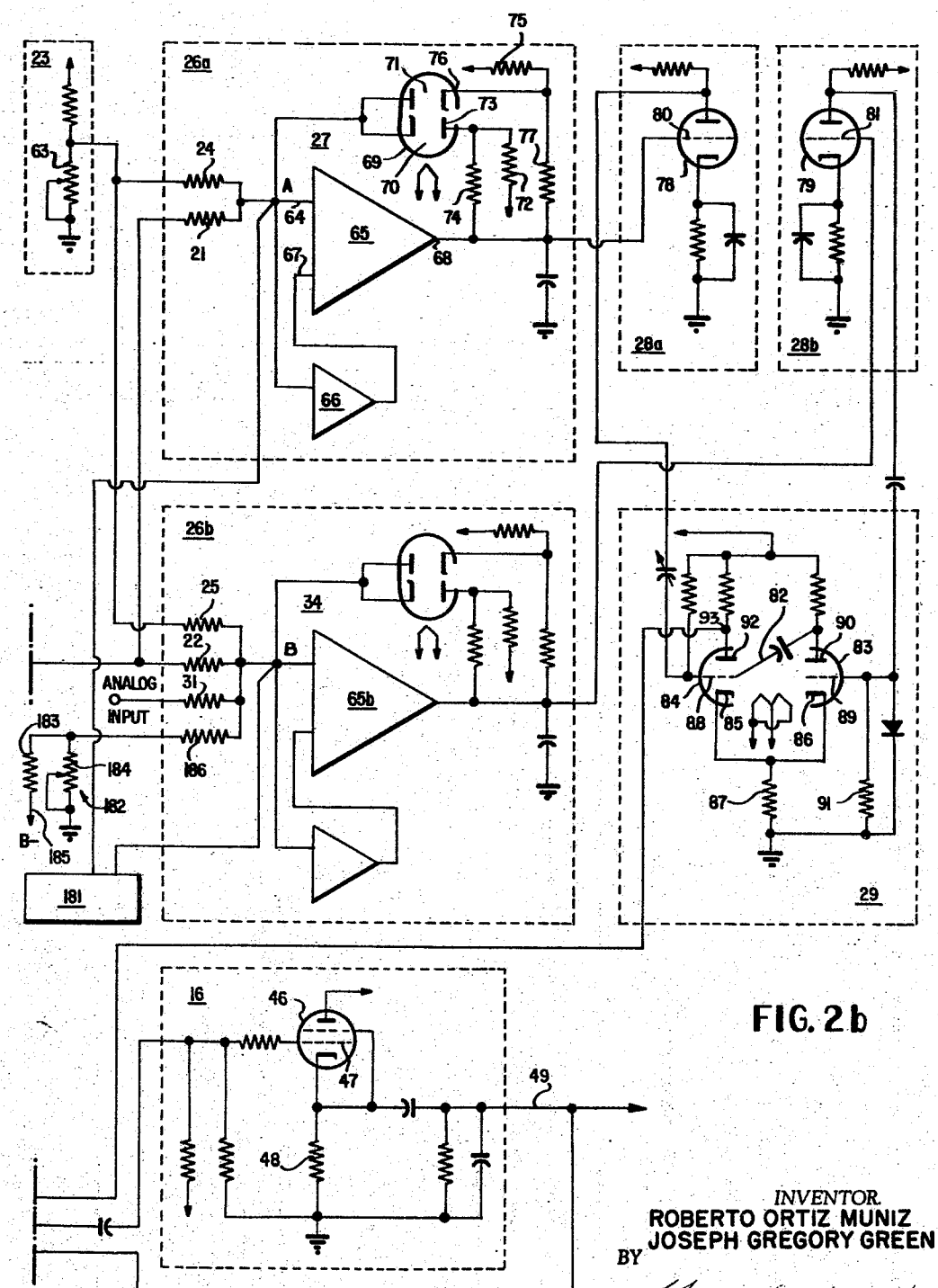
Figure 4:
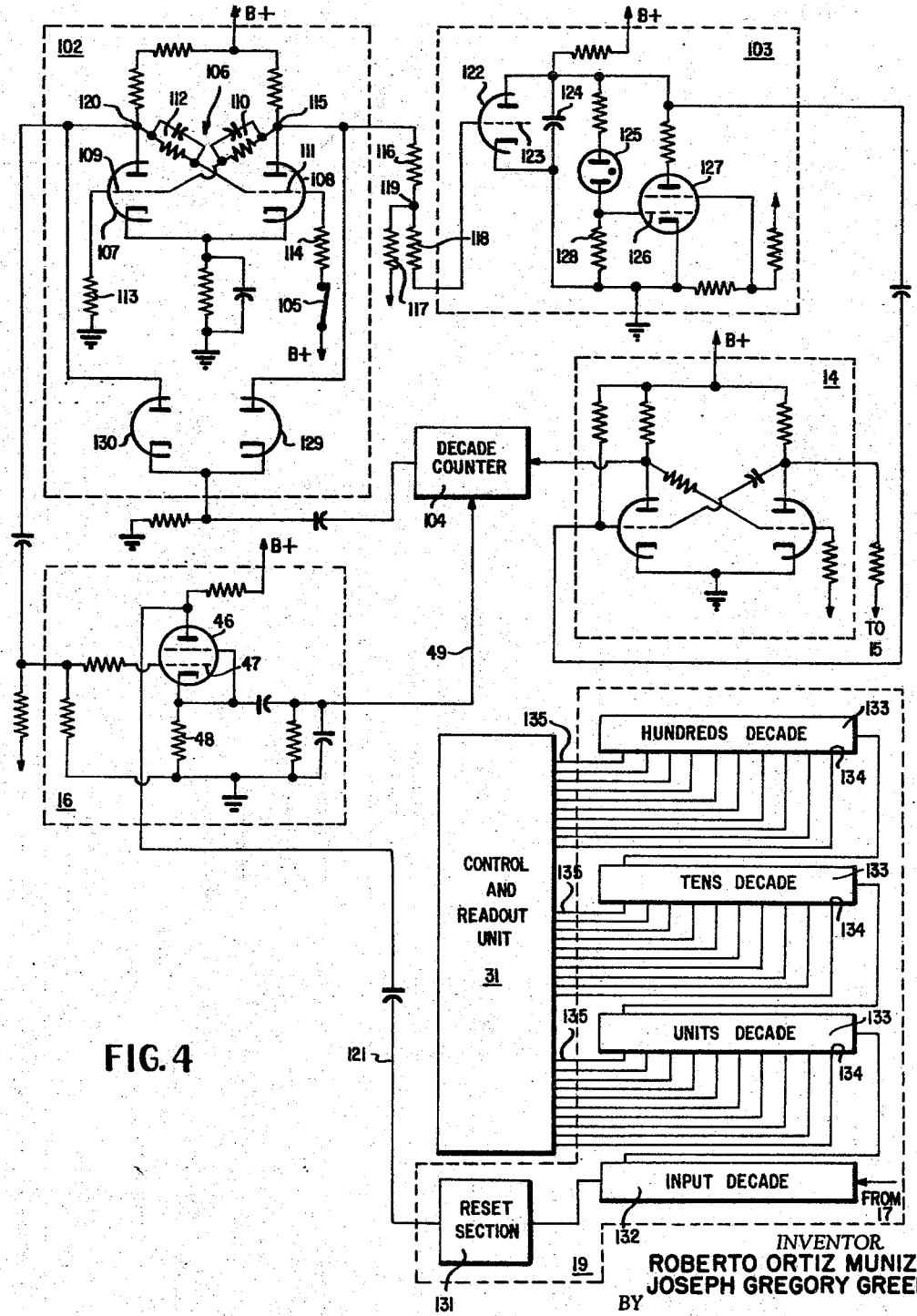
Figure 6:
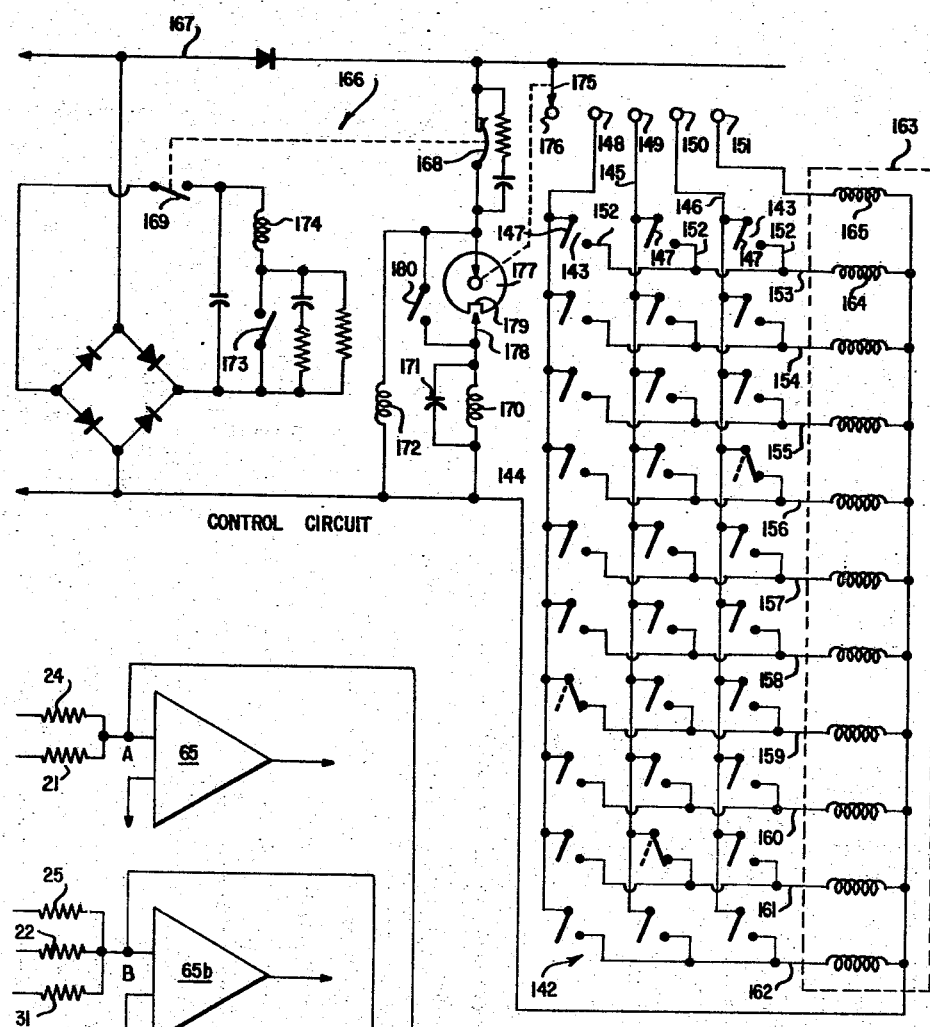
Figure 7:
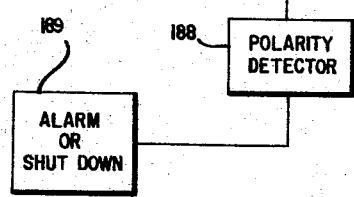

The above and further objects and details of this invention will be readily apparent upon a consideration of the following specification taken with the accompanying drawings in which:

FIGURE 1 is a block diagram of the basic measuring and conversion system of the present invention, FIGURES 2a and 2b illustrate a schematic diagram of the measuring and conversion system of FIGURE 1, FIGURE 3 is a block diagram of a ten count sampling system for incorporation within the measuring and conversion system of the present invention, FIGURE 4 is a diagrammatic representation of the circuit of the ten count sampling system of FIGURE 3, FIGURE 5 is a diagrammatic representation of the output units employed with each decade section of the decade counter of FIGURE 4, FIGURE 6 is a circuit diagram of the control and readout unit of FIGURE 4; and FIGURE 7 is a block diagram of the anti-runaway circuit of FIGURE 1.

Referring now to FIGURE 1, the basic measuring and conversion system of the present invention indicated generally at 10 includes a sampling circuit 11 and an external trigger circuit 12 which may be selectively connected to the system 10 by a selection switch 13. Sampling circuit 11 may basically consist of any unit which acts to automatically furnish trigger pulses to trigger the measuring system 10 at fixed time intervals, but an improved sampling circuit which in incorporated within the measuring system of the present invention will be subsequently described in connection with FIGURES 3, 4, 5 and 6.

The external trigger circuit 12 may consist of any conventional circuit capable of producing a triggering pulse upon the happening of any desired event. It may, therefore, be seen that the operation of the measuring and conversion system 10 may be initiated at periodically recurring intervals by connecting the sampling system 11 to the measuring system 10 by means of the switch 13, or that the operation of the measuring system may be initiated upon the occurrence of a predetermined event by connecting the external trigger circuit 12 to the system 10. Pulses from either the sampling system 11 or the external trigger 12 are directed through the switch 13 to a reset and ramp gate 14, which responds to each triggering pulse by sending, simultaneously, a signal potential to a switch circuit 15 and a reset circuit 16. Upon the reception of the signal from the reset and ramp gate 14, the reset circuit 16 is energized to provide a reset potential to a divider circuit 18 and a counter unit 19. This reset potential causes counter unit 19 to be reset to a zero indication in preparation for a new digital indication.

Simultaneously, with the signal potential to the reset circuit 16, the reset and ramp gate 14 sends a potential to initiate the operation of the switch circuit 15. The initiation of switch circuit 15 causes a ramp generator 20 to provide a substantially linearly increasing ramp voltage across resistors 21 and 22, which are of equal value. For purposes of description, this ramp voltage will be designated as a negative going voltage, although, as will be indicated by further explanation later, this ramp voltage could constitute a linearly increasing positive voltage.

As the negative going ramp voltage from the ramp generator 20 applied to resistors 21 and 22 begins to increase linearly in a negative direction, a positive offset voltage from an offset voltage source 23 is applied to a resistor 24 and a resistor 25. The algebraic sum of the negative going ramp voltage and the positive offset voltage at summing point A is applied to a first comparison circuit 26a which includes a zero-crossing detector 27 and resistors 21 and 24. When the algebraic sum of the negative going ramp voltage across the resistor 21 and the positive offset voltage across the resistor 24 is equal to zero, the zero-crossing detector 27 directs a positive start pulse to a pulse amplifier 28a. This start pulse is amplified in the pulse amplifier 28a and is then applied to a counter gate 29 which controls the operation of the oscillator gate 17. When the counter gate 29 is triggered by a start pulse from the pulse amplifier 28a, a potential is applied from the counter gate to the oscillator gate 17, causing the oscillator gate to pass pulses from a stable oscillator 30. The pulses from the oscillator 30 are fed through the gate 17 to the divider circuit 18 which operates to divide the oscillator frequency by a predetermined factor. The divider circuit 18 then feeds the signal pulses to the counter circuits 19. The divider circuit 18 may be omitted from the circuit of the measuring and conversion system 10, and is used only to reduce possible flicker effect in the pulse signal from the oscillator 30. The counters 19 count the number of pulses received from the oscillator 30 and feed a digital indication of this count to a suitable control and readout unit 31. Unit 31 may include various indicating devices such as printers, typewriters, adding machines, tape punchers, card punchers or the like, to provide a visual indication of the digital signal from the counters 19.

Simultaneous with the institution of the ramp voltage applied to the resistor 21 and the positive offset voltage applied to the resistor 24, the negative going ramp voltage is also applied to a resistor 22, while the offset voltage is applied to a resistor 25. During the application of these voltages to the resistors 22 and 25, the unknown analog input voltage to be measured is applied to a resistor 32. This input voltage may be provided by any desired source, and for measuring applications it will normally be provided by a suitable sensing means which is capable of producing an output analog voltage proportional to a function to be measured. In force measuring applications, the analog input voltage will normally be developed by a load cell 33 which is electrically connected to the resistor 32. Block 33 of FIGURE 1 represents any well known load cell with the necessary amplification circuitry attendant therewith. The algebraic sum of the negative going ramp voltage, the positive offset voltage, and the analog input voltage is developed at a second summing point B connected to a second zero-crossing detector 34 in the comparison circuit 26b which includes the resistors 22, 25 and 32, the summing point B, and the zero-crossing detector 34. When the algebraic sum of the negative going ramp voltage and positive going analog voltage and offset voltage reaches zero, the zero-crossing detector 34 is caused to provide a stop pulse to a stop pulse amplifier 28b, and this amplified pulse is then fed to the counter gate 29 to restore the counter gate to its initial closed condition. The closing of the counter gate 29 causes the removal of the operating potential from the oscillator gate 17, thus closing the oscillator gate to prevent further pulses from the oscillator 30 reaching the counter units 19.

The summing points A and B are electrically connected to an anti-runaway circuit 181. This circuit, as will be described in connection with FIGURE 7, guards against a runaway counter condition which might occur if the analog input voltage to the measuring and conversion system 10 should be less than the value of the initial ramp voltage when the ramp is initiated. Also, the summing point B is connected to a variable input compensation circuit 182. This circuit includes resistors 183 and 184 which are connected in series between a source of potential 185 and ground. Source 185 must furnish a potential which is opposite in sign to that of the input analog voltage from source 33, and, for purposes of illustration in FIGURE 1, constitutes a source of B— voltage. A resistor 186 is connected to summing point B and also to a point between resistors 183 and 184. Resistor 184 is a potentiometer which may be varied to control the potential provided from the resistor 186 to the summing point B, and potentiometer 184 may be set so that the compensation circuit 182 provides a voltage to cancel out any error voltage which may constitute a component of the input analog voltage applied to resistor 32. In force measuring applications where the load cell 33 is combined with a mechanical structure, such as a weighing platform, the provision of the input compensation circuit 182 is of prime importance, as the "dead weight" of the mechanical structure will cause a resultant error in the input analog voltage. This error voltage is cancelled at summing point B by an equal, opposite voltage from the input compensation circuit 182.

In the operation of the conversion unit 10 of FIGURE 1, an analog voltage input is applied to the resistor 32 and the switch 13 is set to convey actuation pulses to the reset and ramp gate 14 from either the sampler 11 or the external trigger 12. Upon the reception of these actuation pulses, reset and ramp gate 14 simultaneously provides a potential to a switch circuit 15 and to a reset unit 16. Reset unit 16 then provides a pulse which causes counters 19 to be reset to their zero indication, while the switch circuit 15 initiates the operation of the ramp generator 20. Ramp generator 20 furnishes a linearly increasing ramp voltage to resistor 21 and resistor 22. The negative going ramp voltage applied to the resistor 21 is algebraically summed with an offset voltage from an offset voltage source 23 which is applied to a resistor 24. This summing operation is accomplished within the comparison circuit 26a which includes the resistors 21 and 24, the summing point A and the zero-crossing detector 27. The detector 27 operates to furnish a start pulse to the pulse amplifier 28a when the algebraic sum of the voltages across the resistors 21 and 24 is equal to zero. Upon the reception of the pulse from the detector 27, the pulse amplifier 28a provides a pulse to a counter gate 29, which then sets an oscillator gate 17 to pass pulses from a timed oscillator 30. These pulses pass through a divider 18 to a plurality of counter units 19 which provides a digital indication to be read out by a control and readout unit 31. Unit 31 includes control circuitry to read, store or indicate the digital indication from the counter units 19.

While the voltages across the resistors 21 and 24 are being combined within the comparison circuit 26a, the negative ramp voltage applied to the resistor 22 is being algebraically combined at summing point B within the comparison circuit 26b with the analog voltage which is applied to the resistor 32, the positive voltage from the offset voltage source 23 which is applied to the resistor 25, and the compensation voltage from the resistor 186. When the algebraic sum of the voltages across the resistors 22, 25, 32 and 186 is equal to zero, the zero-crossing detector 34 provides a stop voltage pulse to the pulse amplifier 28b. Pulse amplifier 28b then furnishes a stop pulse to the counter gate 29 to cause the removal of potential from the oscillator gate 17. This removal of potential from the oscillator gate 17 opens the oscillator gate to prevent further pulses from the oscillator 30 from reaching the counter units 19.

Ideally, there would be no error voltage included within the input analog signal, and the input compensation circuit 182 could be eliminated.

For purposes of illustration, the ramp voltage produced by the ramp generator 20 has been designated as a linearly increasing negative ramp voltage, while the voltages generated by the offset voltage source 23 and the load cell 33 have been designated as positive voltages. It will be obvious, from a review of the operation of the measuring and conversion system 10, that it is necessary for the offset voltage and analog input voltage to be opposite in polarity from the linearly increasing ramp voltage, but it is entirely possible to utilize a linearly increasing positive ramp voltage in conjunction with a negative offset voltage and a negative analog input voltage.

A review of the algebraic summing process occurring in the two comparison circuits 26a and 26b implies that there is a slight delay which occurs between the initiation of the linearly increasing ramp voltage by the ramp generator 20 and the provision of a start pulse by the detector 27. The duration of this delay is determined by the amplitude of the offset voltage developed across the resistor 24 by the offset voltage source 23. It may be seen that by varying the amplitude of the offset voltage derived from the offset voltage source 23, the delay occurring between the initiation of the ramp voltage and the start pulse may be increased or decreased. This delay period determines the position along the ramp voltage curve where the occurrence of the start pulse will take place, and therefore, by controlled variance of the delay, the position along the ramp curve where the analog voltage measuring action will take place may be varied. At the instant of time when the negative ramp voltage applied to the resistor 21 is zero, the positive value of the offset voltage applied to resistor 24 will cause the algebraic sum of the voltages with the comparison circuit 26a to be equal to some positive voltage value. As the negative going ramp voltage across the resistor 21 increases in a negative direction, the algebraic sum within the comparison circuit 26a will decrease until it reaches a zero crossing point. At this point, the detector 27 is actuated. It now becomes evident why the reset and ramp gate 14 is enabled to furnish simultaneous signals to start the ramp generator 20 and to reset the counter units 19. The start pulse, which causes the opening of the oscillator gate 17 so that pulses from the oscillator 30 are enabled to reach the counters 19, actually occurs at a time after the ramp generator 20 begins to generate the negative going ramp voltage. During the time wherein the negative going ramp voltage is increasing to a negative value which is equal to the positive value of the offset voltage from the offset voltage source 23, the counter units are reset to indicate a zero condition.

It is obvious that if the counter units 19 and the control and readout unit 31 are to provide an accurate digital indication which is representative of the amplitude of the analog input voltage developed across the resistor 32, some compensation must be provided to offset the error introduced by the time required for the negative going ramp signal across the resistor 21 to neutralize the positive offset voltage across the resistor 24 so that a start pulse could be initiated by the detector 27. This compensation is provided within the comparison circuit 26b where the negative going ramp voltage across the resistor 22 is compared with the analog input signal across the resistor 32. It will be noted that within the comparison circuit 26b, the positive offset voltage is added to the positive analog input voltage and the sum of these two voltages is then algebraically added to the negative going ramp voltage across resistor 22. The detector 34 is not actuated until the algebraic sum of the voltages across the resistors 22, 25 and 32 reaches zero. Therefore, when the algebraic sum of the analog input voltage across the resistor 32 and the negative going ramp voltage across the resistor 22 is equal to zero, the detector 34 will not be operative, as a positive voltage equal to the magnitude of the offset voltage across the resistor 25 still exists within the comparison circuit. The negative going ramp voltage across the resistor 22 must continue to increase in a negative direction until the positive offset voltage across the resistor 25 is neutralized, and the extent of the forthcoming delay in the actuation of the zero-crossing detector 34 is equal to the delay period existing between the initiation of the ramp voltage and the production of the start pulse by the zero-crossing detector 27. This delay in the initiation of the stop pulse acts to compensate for the corresponding delay in the initiation of the start pulse from the detector 27, and the two delay periods are equal, as they were both occasioned by the offset voltage from the offset voltage source 23.

Furthermore, it becomes evident that through the employment of separate zero-crossing detectors 27 and 34 and separate comparison circuits 26a and 26b, the measuring and conversion system 10 of the present invention cannot be subjected to the runaway condition when the magnitude of the input analog signal developed across the resistor 32 is exactly equal to the magnitude of the ramp voltage at the point where the ramp voltage is initiated. Also, as will be hereinafter explained in connection with FIGURE 7, the anti-runaway circuit 181 prevents a runaway condition when the input analog signal is initially of less value than the initial ramp voltage. In conventional systems when either situation exists, there is no zero crossing point at which the ramp voltage becomes equal to the input analog voltage, and therefore, no stop pulse can be initiated to terminate the operation of the counter units. However, in the measuring system 10 of the present invention, the start pulse is initiated by a zero crossing condition at one coincidence point in a start pulse comparator 26a while the stop pulse is initiated at a second zero crossing point in a stop pulse comparator 26b. Thus, these two pulses could occur exactly at the same instant, and would so occur if the analog signal applied to the resistor 32 were equal to the value of the negative going ramp signal at the time when the ramp signal was initiated.

FIGURES 2a and 2b illustrates a typical circuit diagram for the measuring and conversion system of FIGURE 1 and will now be described in detail to more fully illustrate the structure and advantages of the present invention. To further facilitate the analysis of the circuit diagram of FIGURES 2a and 2b, the individual circuits illustrated by the blocks of FIGURE 1 have been enclosed in broken lines and designated by the reference numeral utilized with the corresponding block in FIGURE 1.

Referring now to FIGURES 2a and 2b, it may be seen that the external trigger 12 of FIGURE 1 is eliminated, and that the measuring system 10 includes only the sampling unit 11. Therefore, the inclusion of switch 13 is no longer necessary and the sampling unit 11 is capacitively coupled to the reset and ramp gate 14.

As stated relative to FIGURE 1, the sampling unit 11 may be basically formed by a suitable circuit capable of providing pulses to initiate the operation of the measuring and conversion system 10. Where the system 10 is being utilized for measuring purposes, and particularly for force measuring applications, the sampling unit 11 may comprise the ten count sampling system to be described subsequently in connection with FIGURES 3, 4, 5, and 6, but to better illustrates the operation of the circuitry of FIGS. 2a and 2b, a uniform pulse producing sampler will be utilized. The sampler 11 of FIG. 2a is basically formed by a relaxation oscillator composed of a capacitor 35 connected across a neon tube 36. The application of a supply voltage from a suitable source of B+ voltage to the capacitor 35 via a series resistor causes a charge to build up in the capacitor, and a corresponding increase in the potential across the neon tube 36. When the firing voltage of the neon tube 36 is reached, the tube will conduct and current will flow through the tube until the capacitor 35 discharges to a value equal to the extinguishing potential of the neon tube. The cathode of the neon tube 36 is connected to the control grid 37 of a thyratron 38 and is biased from ground potential by a resistor 39. The flow of current through the neon tube 36 causes a potential drop across the resistor 39, and thus a positive pulse is produced at the grid 37 of the thyratron 38. This potential on the grid 37 causes the thyratron 38 to conduct, and the thyratron then, in turn, provides a very low resistance path for the discharge of the capacitor 35. The capacitor 35 is therefore caused to discharge very rapidly, and this rapid discharge through the thyratron causes a rapid negative going voltage to be experienced at the plate of the thyratron. This voltage at the plate of the thyratron 38 is fed as a sharp, negative trigger pulse to the reset and ramp gate 14. When capacitor 35 is discharged, the thyratron 38 ceases to conduct, the neon tube 36 ceases to conduct, and the potential is removed from the grid 39 of the thyratron.

The function of the sampling circuit 11 is to automatically trigger the measuring and conversion system 10 so that a digital representation of an analog input may be obtained. This digital representation is obtained each time the system 10 is triggered by a pulse from the sampling unit, and the sampling rate is determined by the pulse rate produced by the unit 11.

The reset and ramp gate 14 contains a single monostable multivibrator which sends simultaneous signals to a reset unit 16 and to a switching circuit 15. The gate 14 comprises a cathode coupled multivibrator employing two triodes 40 and 41. The control grid circuit of the triode 40 is coupled to the plate circuit of the triode 41, while the control grid circuit of the triode 41 is coupled to the plate circuit of the triode 40 in a manner well known in the multivibrator art. The control grid 42 of the triode 40 receives the negative trigger pulse from the sampling circuit 11, and this negative trigger pulse biases the grid 42 to drive the triode 40 from an initial conducting condition to cut-off. The cessation of current flow through the triode 40 results in the establishment of a rapidly rising positive potential at point 43 in the plate circuit of the triode 40. This positive potential at point 43 is fed to the grid 44 of the triode 41 over the grid to plate coupling between the triodes 40 and 41, and biases the grid 44 positively so that the tube 41 is driven from an initial nonconducting condition into conduction. The flow of current through the tube 41 lowers the potential at point 45 in the plate circuit of the tube, and this drop in potential appears as a negative going change of potential which is directed to the switch circuit 15.

In addition to furnishing a positive potential to the grid 44 of the triode 41, the positive potential established at point 43 as the triode 40 ceases to conduct, is fed to the reset unit 16. This positive signal appears at the reset unit 16 substantially simultaneously with the negative going potential furnished to the switching unit 15.

As the reset and ramp gate 14 constitutes a monostable multivibrator, it automatically resets itself and reverts to the initial conduction condition with the triode 40 conducting and the triode 41 nonconducting at a predetermined interval after the expiration of the pulse furnished by the sampling unit 11.

The purpose of the reset unit 16 is to reset the counters 19 to zero at the initiation of the measuring operation, so that the counters will be in proper zero condition before the reception of new information to be registered. The reset unit 16 may also operate to reset the divider unit 18, if the divider unit is included in the measuring system 10.

The reset unit 16 includes a thyratron 46 having a control grid 47 which receives the positive potential pulse from the reset and ramp gate 14. The application of a positive pulse to the grid 47 renders the tube 46 conductive. The flow of current through the thyratron 46 causes a potential drop across a cathode resistor 48, thereby establishing a potential rise at the cathode of the thyratron 46. Thyratron 46 is cathode coupled to the divider circuit 18 and the counters 19 by means of a conductor 49, and the rising potential established at the cathode of the thyratron 46, upon the initiation of current flow through the thyratron, is transmitted as a positive reset pulse to the divider unit 18 and the counters 19 by the conductor 49. This positive pulse acts to clear previous indications from the counters 19.

The negative-going potential, which is supplied to the switching unit 15 by the reset and ramp gate 14, simultaneously with the positive-going reset potential supplied to the reset unit 16, is fed to the grids 50 of a switching tube 51 included in the switching circuit 15. The application of the lowered potential from the reset and ramp gate to the grids 50 of the switching tube 51 establishes a greater negative bias on the grids 50, thereby causing the tube 51 to cease conduction to provide an open switch condition.

Connected across the switching tube 51 of the switch circuit 15 is an operational amplifier 52 comprising any conventional operational amplifier well known to the art. Amplifier 52 is connected to a reference input circuit 53, a second input circuit 54, an output circuit 55, and a feedback loop 56 extending between the output 55 and the input 54. The feedback loop 56 includes a capacitor 57, which, with a resistive input network 58, acts to cause the amplifier 52 to operate as a time integrator-inverter. An input voltage for the amplifier input 54 is provided from a voltage source 59 and is directed to the resistors 60 and 61 of the resistive network 58. A grounded reference gas tube 62 is connected between the voltage source 59 and the resistive network 58 and operates in a well known manner to maintain the voltage provided by voltage source 59 within predetermined limits.

In the operation of the ramp generator 20, when the switch 15, which forms the first stage of the generator 20, is in a closed condition, current flows through the switching tube 51 and no charge is built up across the capacitor 52. However, when the switch 15 is opened by the reduced potential from the reset and ramp gate 14, the capacitor 57 begins to charge and a substantially linear output signal is developed at the output 55 of the amplifier 52. Due to the time integrator inversion action of the amplifier 52, the signal developed at the output 55 of the amplifier is a substantially linearly increasing negative-going ramp signal as indicated at 55a. When the reset and ramp gate 14 resets itself after initially receiving a pulse from the sampling unit 11, the grids 50 of the switching tube 51 will no longer receive a reduced potential from point 45, and the switching tube 51 will again be biased into conduction. With the switching circuit 15 now returned to a closed condition, a low impedance discharge path is furnished for the capacitor 57, and the capacitor will discharge, thereby causing the rapid decay of the output ramp voltage 55a. It may therefore be observed that the switch 15 acts as a control unit for the ramp function.

The linearly increasing negative ramp voltage 55a from the ramp generator 20 is applied to a resistance 21 in the first comparison circuit 26a and to a resistance 22 in the second comparison circuit 26b. The comparison circuit 26a also receives a positive offset voltage from an offset voltage source 23 which may include a potentiometer 63 to control the magnitude of the offset voltage provided by source 23. Potentiometer 63 is the means by which the delay period between the start of the linearly increasing ramp voltage and the initiation of the start pulse is controlled, and therefore, as described in connection with FIGURE 1, the setting of potentiometer 63 will determine the position on the ramp curve at which the beginning of the measurement of the analog input voltage will take place.

The offset voltage from source 23 is applied to resistance 24 within the comparison circuit 26a and is then algebraically added to the voltage across the resistance 21. The positive offset voltage is also applied to resistance 25 in the second comparison circuit 26b, and it is algebraically combined with the negative going ramp voltage across the resistance 22. The comparison circuit 26b also receives the same input ramp voltage as is applied to resistor 21, and this voltage is algebraically combined with the analog voltage and the offset voltage. Additionally, as in FIGURE 1, the input compensation circuit 182 including the resistors 183 and 186 and the potentiometer 184 may be connected to summing point B to provide compensation for error voltages which constitute part of the input analog signals.

The circuit configuration of the first comparison circuit 26a is substantially identical with that of the second comparison circuit 26b. In the comparison circuit 26a, the resistors 21 and 24 are connected through a summing point A to the input 64 of an operational amplifier 65, while in the second comparison circuit 26b, the resistors 22, 25 and 31 are connected through a summing point B to the input 64b of an operational amplifier 65b. The circuit configuration of the comparison circuit 26a, subsequent to summing point A in the circuit, is identical with the circuit configuration of the comparison circuit 26b, subsequent to point B in the circuit, and, therefore, only the circuit components included within the comparison circuit 26a will be herein described. For purposes of clarity, components in the second comparison circuit 26b are given the reference numerals of like components in the comparison circuit 26a, but are designated additionally with the suffix b.

Referring now to the comparison circuit 26a, the summing point A is connected to an input terminal 64 of a chopper stabilized operational amplifier 65 which constitutes a zero-crossing detector of a type well known to the prior art, and also to the input of a stabilizing chopper amplifier 66. The output of the chopper amplifier 66 is applied to a second input 67 of the operational amplifier 65. The chopper amplifier has a low drift rate, and thereby imparts linearity to the high gain operational amplifier 65. The operational amplifiers 65 and 65b constitute the zero crossing detectors 27 and 34 of FIGURE 1.

When the algebraic sum of the voltages across the resistors 24 and 21 is positive, the output signal from the amplifier 65 will be a full negative voltage of a saturation amplitude, while if the algebraic sum of the voltage across resistors 21 and 24 shifts through zero to a negative value, the voltage at the output of the amplifier 65 will swing to a full positive saturation value. To prevent overloading, a dual switching tube 69 including electronic switches 70 and 71 is provided in a feedback loop between the output 68 and input 64 of the operational amplifiers 65 and 65b. A plurality of resistors 77, 75, 74 and 72 constitute a voltage divider network, and the voltage values of these resistors control the output voltage value obtained from the operational amplifier 65. When the output of the operational amplifier rises above this predetermined value, a signal is developed across the resistors 74 and 77, and either the diode 70 or 71 will conduct, depending upon whether the output voltage from the amplifier 65 has assumed a positive or negative value. The conduction of either of the diodes 70 and 71 provides a feedback path to the amplifier 65 to control the amplitude of the output signal.

In the operation of the first comparison network 26a, it may be observed that prior to the application of the linearly increasing negative ramp voltage from the ramp generator 20, the voltage within the comparison circuit 26a will be positive due to the application of the positive offset voltage from the voltage source 23. Therefore, the output of the operational amplifier 65 will be a steady negative voltage value. Upon the application of the negative going ramp voltage, the voltage within the comparison circuit 26a will swing through zero and assume a negative value, thereby creating a negative to positive swing in the output voltage at output 68. The switching action of the operational amplifier 65 from a negative to a positive output voltage potential takes place with extreme rapidity, and therefore, a sharp positive output pulse is created by the amplifier. This positive pulse is fed to the pulse amplifier 28a.

The operation of the second comparison circuit 26b is similar to that of the first comparison circuit 26a with the exception that the algebraic voltage sum developed in the comparison circuit 26b constitutes the algebraic sum of the analog input voltage, the linearly increasing ramp voltage, the dead load compensation voltage and the positive offset voltage. It may be seen that the application of the positive offset voltage to the comparison circuit 26b in conjunction with the positive analog input voltage serves to compensate for the time elapsing between the initiation of the negative going ramp voltage and the time when a positive start pulse is created by the operational amplifier 65. Thus, when the negatively increasing ramp voltage is equal to the sum of the positive offset voltage and the analog input voltage across resistors 22 and 25, the voltage developed thereafter within the comparison network 26b will begin to increase in a negative direction causing the operational amplifier 65b to provide a positive pulse to the pulse amplifier 28b.

As has been previously described, when the input analog voltage applied to the measuring and conversion system 10 is exactly equal in magnitude to the ramp voltage at the point where the ramp is initiated, no runaway counter condition occurs, as the comparison circuits 26a and 26b are capable of providing stop and start pulses simultaneously. However, if the analog voltage provided at summing point B should be opposite in polarity to the analog voltage normally furnished, a runaway counter condition might still occur in the absence of the anti-runaway circuit 181 which is electrically connected to summing points A and B.

Referring to FIGURE 7, it may be seen that anti-runaway circuit 181 includes a differential voltage detector 187, such as an operational amplifier, which is connected to summing points A and B. The output of the differential voltage detector 187 is connected to a polarity detector 188, which, in turn, is connected to a control circuit 189. Circuit 189 may constitute an alarm circuit or any known switching control circuit which would operate to close gate 17 or to deactivate the measuring and conversion system 10 upon the occurrence of an abnormal condition.

To illustrate the operation of the anti-runaway circuit 181, it will be assumed that a negative-going zero crossing at summing point A produces a start pulse, and similarly a negative-going zero crossing at point B, normally occurring later than at point A, produces a stop pulse. Opposite polarities could equally well be used.

Under normal conditions, with zero analog input, the potentials of points A and B remain identical in the absence of a compensation potential from the input compensation circuit 182, and hence a start pulse and a stop pulse would occur simultaneously if the measuring and conversion system 10 were triggered into operation and the counter and oscillator gates 29 and 17 would not open. Thus a zero indication would result.

However, many situations are possible, and in practice arise, in which the analog voltage fed to summing point B has opposite to normal polarity. This condition may arise in a weighing system, for example, during oscillatory loading or in any other static or dynamic situation producing a "less than zero load" reaction on a force-sensing element. In such cases, the analog signal at summing point B reaches a coincidence with the ramp voltage and causes a resulting stop pulse prior to the occurrence of the start pulse arising from the coincidence of the offset voltage with the ramp voltage at summing point A. Thereafter, the start pulse is initiated and, there being no later stop pulse, the counter 19 "runs wild" until reset to zero.

In the above condition, it is clear that a runaway situation accompanies a difference of potential between points A and B wherein A is positive and B is negative. Therefore, if the differential device 187 is connected between summing point A and summing point B, then a usable signal at its output appears in one polarity for normal loads, including zero analog input, but appears in the opposite polarity for less than zero analog input. Thus, if the differential detector 187 constitutes an operational amplifier of the type well known to the prior art, the polarity of the output signal provided thereby would change rapidly if the relationship between the input potentials provided to the amplifier should change. The operational amplifier could be set to provide an output of one polarity under normal conditions, when the analog input voltage at the summing point B is initially of a value equal to or greater than the negative ramp signal at the instant when the ramp is initiated, and to shift to an output of the opposite polarity when the analog voltage is of less value than the initial ramp voltage. The action of the operational amplifier would be controlled by the voltage relationship between the summing points A and B. This relationship would be experienced at the inputs of the differential detector 187.

As the output signal from the differential detector 187 will be of one polarity under normal conditions, a signal of this polarity will fail to pass through the polarity detector 188 to the control circuit 189. However, polarity detector 188 will be set to pass a signal of the polarity arising when an abnormal analog voltage is provided to the summing point B, and this signal from the differential detector 187 will actuate the control circuit 189 so that an alarm is sounded or the measuring and conversion system 10 is deactivated.

The pulse amplifiers 28a and 28b include conventional triode amplifier tubes 78 and 79 connected to amplify the positive start and stop pulses from the detectors 65a and 65b. A positive start potential from the detector 65 is directed to the grid 80 of the amplifier 78, while the stop potential from the detector 65b is directed to the grid 81 of the amplifier 79. The application of the positive start and stop potentials to the grids of the triode amplifiers 78 and 79, causes the conduction of the amplifiers so that an amplified negative signal is directed from the output of each amplifier to the counter gate 29.

Counter gate 29 includes a conventional cathode coupled twin triode multivibrator 82 having triode sections 83 and 84. The cathodes 85 and 86 of the triodes 83 and 84 are connected together and are also connected to ground through a common resistor 87. The grid 88 of the tube 84 is connected through a capacitive coupling to receive the amplified start pulse signal from the triode amplifier 78, while the grid 89 of the triode 83 is capacitively coupled to receive the amplified stop pulse from the triode amplifier 79. Additionally, the grid 88 of the tube 84 is capacitively coupled to the plate 90 of the tube 83, while the grid 89 of the tube 83 is connected to ground through a resistor 91.

Normally, when no operating potential is applied to the multivibrator 82, the grid of the triode 84 is positively biased and the triode is conducting. The anode 92 of the triode 84 is coupled to the anode 90 of the triode 83 so that the flow of current through the triode 84 establishes a potential drop across the resistor 87. This potential drop across the resistor 87 makes the cathode of the triode 83 more positive than the grid thereof, so that the triode 83 is cut off. The negative start pulse from the pulse amplifier 28a develops a negative bias on the grid 88 of the tube 84, thereby causing the tube 84 to cease conduction. The cessation of current flow through the tube 84 lowers the potential drop across resistor 87, thereby reducing the potential at the cathode 86 of the tube 83 so that the tube 83 is permitted to go into conduction. As the lower potential drop across resistor 87 permits the tube 83 to begin conducting, the cessation of current flow through the tube 84 causes a potential rise at point 93 in the anode circuit of the tube. This potential rise is fed as a positive potential to the oscillator gate 17.

When the amplified negative stop pulse from the stop pulse amplifier 28b reaches the grid 89 of the tube 83, the tube 83 ceases to conduct and the multivibrator 82 is reset to its initial condition. With the tube 84 again conducting, the potential at point 93 drops, thereby causing a drop in the potential furnished to the oscillator gate 17. This drop in the potential from the counter gate 29 to the oscillator gate 17 causes the oscillator gate to close.

The monostable multivibrator 82 within the counter gate 29 performs several important functions which contribute greatly to the over-all operation of the measuring and conversion system 10. With the pulse amplifiers 28a and 28b, the monostable multivibrator 82 operates rapidly to insure that sharp, fast changes in potential are furnished to the oscillator gate 17. As previously described, the operational amplifiers 65 and 65b, which constitute the stop pulse and start pulse zero-crossing detectors 27 and 34, change condition with extreme rapidity, thereby providing rapidly rising start and stop pulses to the pulse amplifiers 28a and 28b. It is extremely important that the potentials furnished by the start and stop pulse detectors rise rapidly, as otherwise a drift situation may occur. This drift situation would give rise to a time error, as the control potentials from the start and stop pulse detectors are fed through the system to operate the oscillator gate 17. A time error in the operation of the oscillator gate 17 would cause a resultant digital error to be recorded in the counter units 19. Without a rapidly operating counter gate such as the gate 29, which achieves rapid operation through the utilization of the monostable multivibrator 82, the advantages obtained by the employment of rapidly operating operational amplifiers as the start and stop pulse detectors would be lost to the system.

The monostable multivibrator 82 of the counter gate 29 also operates as a safety unit to check a runaway condition in the counter units 19 if the detector 34 should fail. Under normal conditions, the monostable multivibrator 82 is first triggered by a negative start pulse from the pulse amplifier 28a, but before the multivibrator has a chance to reset itself, it is reset by the negative amplified stop pulse from the pulse amplifier 28b. If, by chance, the ramp, analog, and offset voltages do not come into coincidence in the comparison circuit 26b, or if there is a failure of the detector 34 to provide a stop pulse, the monostable multivibrator 82 will reset itself automatically and thereby remove the positive operating potential from the oscillator gate 17. The automatic resetting operation of the monostable multivibrator 82 is particularly advantageous as a safety feature when the ten count sampling system of FIGURES 3, 4, 5 and 6, to be hereafter described, is utilized in conjunction with the measuring and conversion system 10. When ten samples of the input analog voltage are taken, if the detector 34 fails to operate properly during one sample period, the multivibrator 82 will reset itself, and the nine valid sample indications obtained will tend to average out the erroneous sample.

The oscillator gate 17 includes a pentode amplifier tube 94 having a grid 95 which is initially negatively biased predominantly by a fixed source of negative bias through a resistor 96 in conjunction with the initially low potential at the plate 92 of the triode 84. The negative bias on the grid 95 prevents the conduction of the tube 94 under initial conditions.

The grid 95 is capacitively coupled to the stable oscillator 30, which furnishes alternating potentials to the tube 94, but the initial bias on the grid 95 is sufficiently negative so that even the positive excursions from the oscillator do not drive the tube into conduction. However, the positive start potential from the counter gate 29, when applied to the grid 95 of the tube 94 as hereinbefore described, in conjunction with the positive excursions from the oscillator 30, is sufficient to overcome the initial negative bias voltage on the grid 95. Therefore, the tube 94 is permitted to conduct when both the oscillator pulses and the positive potential from the counter gate 29 are applied to the grid 95, and a varying voltage is developed at the anode 97 of the tube 94 in accordance with the oscillator pulses at the grid 95. Upon the application of the stop pulse from the pulse amplifier 28b to the counter gate 29, the positive potential at the grid of the tube 94 is removed, thereby terminating the development of output pulses at the anode 97.

The pulses at the anode 97 of the pentode 94 are directed to a divider circuit 18. Divider circuit 18 includes a plurality of intercoupled, bistable, multivibrator stages 98 and 99 of conventional configuration. Considering only the first multivibrator stage, the output signal from the anode 97 of the pentode gating tube 94 is fed through a diode switch 100 to trigger a twin triode multivibrator tube 101. The twin triode multivibrator tube 101 of the multivibrator stage 98 divides the signal frequency from the oscillator gate 17 by two and feeds the output signal to the subsequent multivibrator section 99. This process may be repeated through any number of multivibrator divider stages until an output signal of a desirable frequency is obtained and fed to a suitable digital counter unit. The divider unit 18 is not an essential part of the measuring and conversion system. A counter unit and readout unit specifically adapted for the measuring and conversion system of the present invention will subsequently be described in connection with FIGURES 4, 5 and 6.

Figure 3 is a block diagram illustrating a preferred embodiment of the sampling system 11 of FIGURE 1. As previously mentioned, the accuracy of a voltage measuring and conversion system is often adversely affected by a varying analog voltage at the input to the system. Situations giving rise to this varying analog input condition occur frequently, for example, during force measuring operations where motion weighing or the measurement of forces passing rapidly over a force sensing device is accomplished. The multiple count sampling system of FIGURE 3 reduces the error caused by a varying input analog voltage to a measuring and conversion system by taking a plurality of samples of the input analog voltage, so that these samples may be averaged to obtain an output indication of increased accuracy. For purposes of illustration, the sampling system of FIGURE 3 constitutes a ten count sampling system, but it is evident that the sampling system may be designed to furnish any predetermined number of counts.

Referring now to the block diagram of FIGURE 3, the ten count sampling system 11 includes a sampler gate 102 which is electrically connected to a sampler 103 and to the reset unit 16 of FIGURE 1. Sampler 103 is connected to the reset and ramp gate 14 of FIGURE 1, which is in turn connected to a decade counter 104. Decade counter 104 receives an input from the reset unit 16 of FIGURE 1 and provides an output to the sampler gate 102. A switch 105 provides an input signal from a suitable source of potential to the sampler gate 102 to initiate the operation of the sampling system 11.

In the operation of the sampling system 11, switch 105 is representative of any switch which closes momentarily upon command. When switch 105 closes, a pulse is furnished to open the sampler gate 102. This gate 102 can constitute a monostable multivibrator, and as such, would close itself after a predetermined time, but preferably constitutes a bistable multivibrator which requires a defined signal from an outside source before closure is accomplished.

Upon the opening of the sampler gate 102, a pulse is sent to the reset circuit 16, which in turn sends a pulse to set the decade counter 104 and the counters 19 to a zero condition. Simultaneously, the sampler gate 102 sends a pulse to the sampler circuit 103 to initiate the sampling operation. Sampler circuit 103 provides timed pulses to the reset and ramp gate 14, and each time the sampler "fires," the ramp gate opens and a measurement of the input analog voltage is taken by the measuring and conversion system 10. Each time the ramp gate 14 opens, a pulse is sent to the decade counter 104, and after the ramp gate 14 has sent ten pulses to the decade counter 104 to indicate that ten measurements have been taken by the measuring and conversion system 10, an output pulse is sent from the decade counter 104 to close tthe sampler gate 102. This output pulse from the decade counter is the pulse normally called the carry-over pulse in decade counting systems and is the pulse used in a decade indicating system to advance the next counter one unit.

The operation of the ten count sampling system of FIGURE 3 may be better understood by referring to FIGURE 4, which illustrates a circuit diagram of the system shown by FIGURE 3. For clarity of description, the blocks of FIGURE 3 are shown in broken lines in FIGURE 4 and are designated with the reference numerals provided in FIGURE 3. Referring to FIGURE 4, it may be seen that the sampler gate 102 is formed by a bistable multivibrator 106 which includes twin triode sections 107 and 108. Bistable multivibrator 106 is a typical circuit well known to the multivibrator art wherein the grid 109 of the triode 107 is coupled to the plate circuit of the triode 108 by a parallel capacitor-resistor combination 110, while the grid 111 of the triode 108 is coupled to the plate circuit of the triode 107 by a parallel resistor-capacitor combination 112. The grid 109 of the triode 107 is coupled to ground potential by a resistor 113, while the grid 111 of the triode 108 may be selectively coupled to a suitable source of potential by a resistor 114 and the switch 105.

In the operation of the sampler gate 102, with the switch 105 in the closed position, the triode 108 of the bistable multivibrator 106 will be biased so as to be nonconducting, while the triode 107 will be biased into conduction. With the multivibrator 106 in this initial condition, a high potential will be developed at a point indicated as 115 in the plate circuit of triode 108, and through the divider action of resistors 116 and 117, a high potential will also be established at point 119 in the coupling circuit between the sampler gate 102 and the sampler 103. As the sampler gate 102 constitutes a bistable multivibrator, it must be driven from one conducting state to another by a very defined signal from an outside trigger source. This outside trigger source is constituted, in part, by switch 105, which may be operated by any suitable means. When switch 105 is opened, the grid 111 of the triode 108 is no longer connected to a source of potential by the resistor 114 and the switch 105, and the triode 108 is biased into conduction. The conduction of triode 108 causes a drop in potential at point 115 in the plate circuit of the triode and a corresponding drop in potential at point 119 in the coupling circuit between the sampler gate 102 and the sampler 103. When the bistable multivibrator 106 assumes this second state of conduction under the influence of the control switch 105, the triode 107 is rendered nonconductive and a high potential is experienced at point 120 in the plate circuit of the triode 107. This rise in potential at point 120 appears as a positive pulse at the control grid 27 of the thyratron 46 included within the reset unit 16. This potential from the triode 107 causes the thyratron 46 to conduct and provide a reset pulse in the manner described previously with respect to FIGURES 2a and 2b. However, as illustrated by FIGURES 3 and 4, the reset unit 16 has been modified slightly for utilization with the decade counter 104 of the ten count sampling system. As will be noted from FIG. 4, the lead 49, which carries the reset pulse from the reset unit 16, has been connected to the decade counter 104 of the ten count sampling system, and an additional electrical connection 121 has been provided to carry a reset signal from the plate of the thyratron 46 to the main counter unit 19. The conduction of the thyratron 46 in the manner described in connection with FIGURES 2a and 2b causes a potential to be formed at both the cathode and the plate of the thyratron so that a reset potential is furnished to the leads 121 and 49. The modification in the reset circuit 16 of FIGURES 2a and 2b, as illustrated by FIGURE 4, is not necessary to the operation of the ten count sampler system, as the decade counter 104, when operating properly in conjunction with the remainder of the system, requires no reset pulse. Therefore, the system would operate properly with the lead 49 connected to the counter unit 19 as illustrated by FIGURES 2a and 2b, but the circuit configuration of the reset unit 16 as illustrated by FIGURE 4 provides a safety reset potential to insure the proper setting of the decade counter 104 prior to the initiation of a sampling operation by the ten count sampling system.

The sampler 103 includes a triode 122 having a grid 123 which receives the potential from point 119 in the coupling circuit between the sampler gate 102 and the sampler 103. The triode 122 shunts a capacitor 124 which forms the capacitive element of a relaxation oscillator of the type included in the sampling system 11 of FIGURES 2a and 2b. The capacitor 124 is connected across a neon tube 125 so that the application of a supply potential to the resistor 126 causes the capacitor 124 to charge and increase the potential across the neon tube 125. When the firing voltage of the neon tube 125 is reached, the tube will conduct and current will flow through the tube until the capacitor 124 discharges to a value equal to the extinguishing potential of the neon tube. The cathode of the neon tube 125 is connected to the control grid 126 of a thyratron 127, and is biased to ground potential by a resistor 128. The flow of current through the neon tube 125 causes a potential drop across the resistor 128, and thus a pulse is produced across the grid 126 of thyratron 127. This pulse potential on the grid 126 of the thyratron 127 causes the thyratron to conduct, and the thyratron then provides a low resistance path for the rapid discharge of the capacitor 124. The rapid discharge of the capacitor 124 causes a rapid negative going voltage which is then fed as a sharp trigger pulse to the reset and ramp gate 14.

The operation of the sampler 103 is initially controlled by the triode 122, as the state of the triode 122 determines whether a charge will be built up across the capacitor 124. When the sampler gate 102 is in its initial state of conduction and a high potential is experienced at points 115 and 119, the potential at point 119 will bias the grid 123 of the triode 122 so that the triode will conduct. When conducting, triode 122 constitutes a short across the capacitor 124, so that no charge will be established across the capacitor to initiate the operation of the neon tube 125 and the thyratron 127. With the sampler in this state, no output pulses are furnished to the reset and ramp gate 14, and no control pulses are furnished to the voltage measuring and conversion system 10.

When the sampler gate 102 is caused to assume a second state of conduction under the control of the switch 105, a drop in potential is experienced at points 115 and 119, and consequently a drop in potential is experienced at the grid 123 of the triode 122. This drop in potential at the grid of the triode 122 causes the triode to cease conducting, and therefore, the short is removed from across the capacitor 124. Capacitor 124 now begins to charge, and subsequently causes the conduction of the neon tube 125. The conduction of the neon tube 125 fires the thyratron 127, and a negative going pulse is sent to trigger the reset and ramp gate 14. The reset and ramp gate 14 operates in the manner described with relation to FIGS. 2a and 2b to furnish a control potential to the switch circuit 15 and a signal to the decade counter 104. The switch 15 operates under the influence of the potential from the reset and ramp gate 14 to initiate one measuring cycle of the voltage measuring and conversion system 10, while the decade counter 104 changes from a "zero" to a "one" indication upon the reception of the signal from the reset and ramp gate 14 to indicate that one measurement sample of the input analog voltage has been taken.

After the first sample is taken, the reset and ramp gate 14 automatically resets itself, and is then prepared for a new control signal from the sampler 103. However, the sampler gate 102 does not return to the original state of conduction, as no outside pulse has been furnished to trigger the bistable multivibrator 106 and initiate a change of state. Therefore, no potential rise is experienced at points 115 and 119, and the triode 122 remains cut off so that the capacitor 124 again charges to initiate the operation of the sampler 103. The sampler 103 will continue to furnish pulses to the reset and ramp gate 14 until the voltage measuring and conversion system 10 has completed ten measuring cycles. Upon reception of the tenth signal from the reset and ramp gate 14, the decade counter 104 produces an output pulse which is fed through one of the diodes 129 and 130 to the plate circuits of one of the triodes 106 and 107. This pulse resets the sampler gate 102 to its initial condition of conduction, and therefore, triode 122 is driven into conduction and a short is again provided across capacitor 124. This prevents the further production of control pulses by the sampler 103, and consequently, further measurements of the analog input voltage by the voltage measuring and conversion system 10 are prevented.

As each sampling cycle is completed, the counter unit 19 receives pulses from the oscillator gate 17 and registers a digital indication which is a function of the magnitude of the input analog voltage under measurement. At the completion of the ten count sampling cycle, the control and readout unit 31 reads an average digital indication from the counter 19.

The counter units 19 may consist of any suitable decade counters well known to the counter art, and it will be noted, with reference to FIGURE 4, that block 19 includes one such counter. This counter includes a reset section indicated generally at 131, an input decade 132 to receive the pulses from the oscillator gate 17, and a plurality of interconnected counting decades 133. The output potentials from the decades 133 are taken from a plurality of decade output pins 134 and are transmitted to the control and readout unit 31 by lines 135.

With reference to FIGURE 5, it may be noted that the output lines 135 from the decade sections 133 are connected to a plurality of transistorized circuits within the control and readout unit 31. Each transistor circuit is connected to an individual output pin 134 of the decade counter sections 133. These transistor circuits include a transistor 136 having a base electrode 137 which is connected to the output pin 134, an emitter electrode 138, and a collector electrode 139. The output circuit of the circuit of the collector electrode 139 includes a relay coil 140 shunted by a diode 141.

In the operation of the individual decade sections 133, when one output pin 134 is to provide an output indication, the voltage at this pin will drop below the voltage existing at the remaining pins in the decade section, and therefore the voltage at the base of the transistor 136 connected thereto will drop. This drop in voltage at the base 137 of the transistor 136 will cause the transistor to conduit, while the remaining transistors connected to the decade section will be biased to cut off. The conduction of the transistor 136 will energize the relay coil 140 and close the relay contacts associated therewith.

Referring back to the over-all counter circuit 19 of FIGURE 4, the basic operation of the counter system used in conjunction with the ten count sampling system is illustarted by the following outline. This outline specifies the steps which take place within the counter system 19 as digital indications of the varying analog voltage are received with each sampling step.

*Digital indication registered*

1st sample:

Digital amount 791
    Hundreds decade—0
    Tens decade—7
    Units decade—9
    Input decade—1

2nd sample:

Digital amount 796 added to 1st sample
    Hundreds decade—1
    Tens decade—5
    Units decade—8
    Input decade—7

3rd sample:
   Digital amount 789 added to previous sample
   Hundreds decade—2
   Tens decade—3
   Units decade—7
   Input decade—6

4th sample:
   Digital amount of 793 added to previous samples
   Hundreds decade—3
   Tens decade—1
   Units decade—6
   Input decade—9

5th sample:
   Digital amount of 799 added to previous samples
   Hundreds decade—3
   Tens decade—9
   Units decade—6
   Input decade—8

6th sample:
   Digital amount of 798 added to previous samples
   Hundreds decade—4
   Tens decade—7
   Units decade—6
   Input decade—6

7th sample:
   Digital amount of 792 added to previous samples
   Hundreds decade—5
   Tens decade—5
   Units decade—5
   Input decade—8

8th sample:
   Digital amount of 795 added to previous samples
   Hundreds decade—6
   Tens decade—3
   Units decade—5
   Input decade—3

9th sample:
   Digital indication of 800 added to previous samples
   Hundreds decade—7
   Tens decade—1
   Units decade—5
   Input decade—3

10th sample:
   Digital indication of 792 added to previous samples
   Hundreds decade—7
   Tens decade—9
   Units decade—4
   Input decade—5

As may be seen from the above outline, when the ten count sampling cycle is complete, the counter system 19 will register a digital indication which is the sum of the individual indications registered during each sampling step. It is now necessary for the control and readout unit 31 to read out an average indication from the total indication registered by the counter 19. In the example given above, the average digital readout would be 794, and this readout may be obtained by the control and readout circuitry illustrated in FIGURE 6.

FIGURE 6 provides a schematic diagram representative of the remainder of the control and readout circuitry contained within the unit 31 of FIGURE 4. This circuitry, which cooperates with the circuit of FIGURE 5, includes a switching network 142 which is composed from parallel rows of relay switches 143. Switching network 142 contains a row of ten relay switches 143 for each decade unit 133 of the counter 19, and these switches are individually operated by the relay coils 140, as illustrated by FIGURE 5. Therefore, the switching network 142 of FIGURE 6, which is designed to be utilized in conjunction with the counter unit 19 of FIGURE 4, contains a hundreds column 144 of ten switches, a tens column 145 of ten switches, and a units column 146 of ten switches. Each of the relay switches 143 includes a switch arm 147 which is electrically connected to each of the remaining nine switch arms in the same column. The electrical connecting line between each of the switch arms 147 in the individual columns 144, 145 and 146 terminates in a contact terminal so that a contact 148 is provided for the hundreds column, a contact 149 is provided for the tens column and a contact 150 is provided for the units column. An additional print contact 151, which will be later described, is also provided in addition to the contacts 148, 149 and 150.

Each of the relay switches 143 is provided with a switch contact 152, and each switch contact 152 is electrically connected to the adjacent switch contacts in the adjoining columns of switches. Thus the switching network 142 includes three vertical columns 144, 145 and 146, each containing ten electrically interconnected switch arms 147, and ten horizontal columns, 153–162, each including electrically interconnected switch contacts 152. It is quite obvious that the effective range of the voltage measuring and conversion system 10 could be increased by adding more decade units to the counter 19 and additional columns corresponding therewith to the switching network 142.

The switching network 142 may be electrically connected to control any suitable printing or indicating unit. In the circuit diagram of FIGURE 6, the switching network 142 is connected to control a serial input machine 163, such as the familiar ten-key adding machine. In this illustration, each of the horizontal columns 152 through 162 of the switching network 142 is electrically connected to one of ten corresponding solenoids 164 in the adding machine 163. The adding machine is also provided with a print solenoid 165 which is electrically connected to the print contact 151.

To enable the switching network 142 to control the indication provided by the adding machine 163, a readout control unit 166 is provided. Readout control unit 166 receives power from an input power line 167 which is connected to a suitable power source. The control unit 166 includes an interrupter switch 168 and a relay switch 169 which are controlled by a relay coil 170. Relay coil 170 is shunted by a capacitor 171.

A second relay coil 172 controls a relay contact 173 and receives power from the power line 167 through the interrupter 168. Relay switch 169, when closed, enables power to be furnished from the power line 167 to a stepping switch coil 174 which operates to energize a rotary stepping switch 175. Stepping switch 175, which is electrically connected to the power line 167, is capable of moving under the influence of the stepping switch coil 174 from a home switch contact 176 to the switching contacts 148, 149, 150 and 151 of the switching network 142. A homing switch wafer 177 is mechanically linked to the stepping switch 175 so as to rotate when the stepping switch is actuated by the stepping switch coil 174. The homing switch wafer 177 cooperates with a switch contact 178 and, is provided with a cut out section 179 to prevent electrical contact between the wafer 177 and the contact 178 when the cut out is positioned adjacent the contact 178.

The operation of the control circuit 166 is initiated by a command switch 180, which may be manually controlled or automatically controlled by any suitable means. Switch 180 initiates the readout of the counters 19, and therefore should be actuated after a ten count sample has been completed by the voltage measuring and conversion system 10. The command to initiate the counter readout may be provided by the counting circuit, by an external signal, or by any means at all, depending upon the requirements of the particular application for which the voltage measuring and conversion system is utilized.

A better understanding of both the physical structure and the purpose of the control circuit 166 may be obtained from a consideration of the operation of the control circuit in conjunction with the switching network 142 and the serial input machine 163. After ten samples are taken and digital indications are stored within the counter 19, the command switch 180 is closed either manually or by suitable automatic means. Previous to the closing of the command switch 180, relay coil 172 is energized by current flowing through the interrupter 168, and the relay coil 170 is de-energized, as switch 180 is open and the homing wafer switch 177 is also open. Thus, relay switch 169 is open and no power is furnished to the stepping switch coil 174. The stepping switch 175 is positioned on the home contact 176.

Upon the closing of the command switch 180, power is caused to flow from the transmission line 167 through the interrupter 168 and the command switch 180 to the relay coil 170. When the relay coil 170 is energized, relay switch 169 closes, and the interconnecting linkage to the interrupter 168 causes the interrupter to open. Closure of the relay switch 169 energizes the stepping switch coil 174, and the stepping switch 175 moves from the home contact to the hundreds contact 148. The linkage between the stepping switch 175 and the homing wafer switch 177 causes the homing wafer switch to move so that contact 178 is closed. When the interrupter 168 opens, the relay coil 172 de-energizes and the relay contacts 173 open. The current flow through the stepping switch coil 174 is now reduced to a value which is sufficient to hold the stepping switch 175 on the hundreds contact, but which will not produce overheating of the switch coil 174. Also, upon the opening of the interrupter 168, the relay coil 170 begins to lose current, but because of the charge on the capacitor 171, there is a slow current decay before the coil 170 becomes sufficiently de-energized to allow the contacts 169 to open. When the contacts 169 open, the stepping switch coil 174 de-energizes and the interrupter 168 is again closed by the linkage to the switch 169. Closure of the interrupter 168 re-energizes the coil 172, and as current now flows through the homing switch wafer 177, the coil 170 is also re-energized and contacts 169 close. Upon closure of the contacts 169, the stepping switch 175 moves to the tens contact 149, the stepping switch coil 174 is energized and the interrupter 168 is opened. This stepping procedure continues automatically with the stepping switch 175 pausing briefly upon each of the contacts 148, 149, 150 and 151. The homing switch wafer 177 follows the progress of the stepping switch 175, and when the stepping switch has completed a full switching cycle and returned to the home contact 176, the homing wafer 177 will again be positioned with the cutaway portion 179 adjacent the switching contact 178.

The switching operation of the stepping switch 175 causes power to be furnished from the power transmission line 167 to the individual hundreds, tens, units and print contacts 148, 149, 150 and 151, respectively. It has been previously described how the relay switches 143 in the switching network 142 are energized in accordance with the digital signals stored in the counter unit 19. Therefore, when the stepping switch 175 moves to the hundreds contact 148, power is furnished from the power line 167 through the hundreds contact and through the closed contacts of the individual relay switch 143 which is operated by the output from the hundreds decade of the counter unit 19. The power from the closed relay switch 143 then flows to the cooperating solenoid in the adding machine 163. The solenoid so energized will represent a hundreds digit which corresponds to the digital output of the hundreds decade in the counter 19. The stepping process is then continued through the tens column and the units column of the switching network 142 until the solenoid coils 164, representing corresponding tens and units digits, have been energized. The stepping switch 175 then moves to the print contact 151 and power is furnished to the print solenoid 165. This energizes the printing mechanism within the adding machine and the digits stored in the adding machine mechanism 163 are printed. It should be noted that no switching contact or switching column is provided in the switching network 142 to correspond with the input decade 132 of the counter 19. Therefore, the last digit of any number stored in the counter 19 is not transferred to the adding machine 163, as this digit is stored in the input decade 132. It is the omission of this last digit that enables the adding machine 163 to print an average indication of the digital signal from a ten count sample which is stored in the counter 19. Thus, with reference to the example given in connection with the storage operation of the counter 19, the indication of 7945, resulting from the ten count sampling operation, would be printed by the adding machine 163 as a value of 794. This value would be representative of the average magnitude of the varying input analog voltage to the voltage measuring and conversion system 10 during the ten count sampling period.

It is obvious that switching network 142 may be easily varied so that machine 163 may include various parallel or serial input adding machines or other digital information handling devices of various types. Also, the control and readout unit 31 may be readily adapted to average digital information obtained during various sampling cycles, and need not be limited to use with a ten count system.

It will be readily apparent to those skilled in the art that the present invention provides a novel and improved voltage measuring and conversion system which is readily adapted to rapidly provide an accurate digital representation of an input analog voltage function. The arrangement and types of components herein may be subject to numerous modifications well within the purview of this inventor who intends only to be limited to a broad interpretation of the specification and appended claims.

We claim:

1. A voltage measuring and conversion system for measuring an unknown analog voltage comprising control means connected to initiate the operation of said measuring and conversion system, voltage generating means for generating a substantially linearly increasing reference voltage, connected to said control means, a counting system, means for providing constant frequency signals to said counting system, and comparator means connected to control the flow of constant frequency signals to said counting system, said comparator means including first comparison means connected to receive said reference voltage and including means to provide a start pulse to initiate the flow of constant frequency signals at a first predetermined time after the initiation of said reference voltage, and second comparison means connected to receive said analog voltage and said reference voltage, said second comparison means operating to compare said analog and reference voltages and including means to provide a stop pulse to terminate the flow of said constant frequency signals at a second predetermined time after said reference voltage has reached a point of equal value with said analog voltage, said second predetermined time being equal to said first predetermined time whereby said counting system is caused to operate for a time period which is a function of the value of said analog voltage.

2. The voltage measuring and conversion system of claim 1 wherein offset control means is connected to said first and second comparison means, said offset control means operating to provide an offset voltage to said first and second comparison means to determine the duration of said first and second predetermined times.

3. The voltage measuring and conversion system of claim 1 wherein said control means connected to initiate the operation of said voltage generating means includes sampling means operable to provide a plurality of sequential actuation signals to said voltage generating means, whereby said measuring and conversion system is caused to execute an equal number of measuring cycles.

4. The voltage measuring and conversion system of claim 3 which includes counter gate means connected between said comparator means and said means for providing constant frequency signals and operative upon the reception of a start pulse from said first comparison means to cause the flow of constant frequency signals to said counting system and upon the reception of a stop pulse from said second comparison means to terminate the flow of said constant frequency signals, said counter gate means operating automatically to terminate the flow of said constant frequency signals upon the failure of said second comparison means to provide a stop pulse.

5. The voltage measuring and conversion system of claim 3 wherein said counting system includes counting means connected to receive and count said constant frequency signals and control and readout means connected to said counting means, said control and readout means operating to provide an average indication predicated upon the number of constant frequency signals received by said counting means during said plurality of sequential measuring cycles.

6. A voltage measuring and converison system for measuring an unknown analog voltage comprising voltage generating means for generating a substantially linearly increasing reference voltage, a counting system, means for providing constant frequency signals to said counting system, control means connected to initiate the operation of said voltage generating means, means to provide a predetermined offset voltage opposite in sign to said reference voltage, and comparator means connected to control the flow of constant frequency signals to said counting system, said comparator means including first comparison means connected to receive said reference voltage from said voltage generating means and said offset voltage, said first comparison means operating to compare said offset and reference voltages and including means to provide a start pulse to initiate the flow of constant frequency signals at a first zero crossing point when the algebraic sum of said reference and offset voltages is equal to zero volts, and second comparison means connected to receive said analog, offset and reference voltages, said second comparison means operating to compare said offset, analog and reference voltages and including means to provide a stop pulse to terminate the flow of constant frequency signals at a second zero crossing point when the algebraic sum of said offset, reference and analog voltages is equal to zero volts.

7. The voltage measuring and conversion system of claim 6 which includes anti-runaway circuit means connected to said first and second comparison means, said anti-runaway circuit means operating to provide a control signal when said input analog voltage is of a lesser value than said reference voltage at the point when said reference voltage is initiated.

8. The voltage measuring and conversion system of claim 6 wherein said control means connected to initiate the operation of said voltage generating means includes ramp gate means operable to simultaneously generate and provide an actuation signal to said voltage generating means and a reset signal to said counting system.

9. The voltage measuring and comparison system of claim 2 in which said offset control means is variable whereby the duration of said first and second predetermined times may be varied to cause the measurement of said analog voltage at different portions along the curve of said reference voltage.

10. The voltage measuring and conversion system of claim 6 in which:
   (a) said first comparison means includes an operational amplifier having an input and an output, said operational amplifier being capable of shifting from a first to a second operational state to provide a start pulse at said output, a summing point connected to the input of said operational amplifier, and means connecting said summing point to said reference voltage generating means and said offset voltage providing means, and
   (b) said second comparison means including an operational amplifier having an input and an output, said operation amplifier being capable of shifting from a first to a second operational state to provide a stop pulse at said output, a summing point connected to the input of said operational amplifier, and means to connect said summing point to said analog voltage source, reference voltage generating means, and offset voltage providing means.

11. The voltage measuring and conversion system of claim 10 in which:
   (a) said voltage generating means for generating a substantially linearly increasing reference voltage includes an operational amplifier having an input and an output, said output being connected to said first and second comparison means, a feedback circuit including a capacitor connected between the input and output of said operational amplifier, an input circuit connected to furnish charging potential from a voltage source to said capacitor, and a switching unit shunting said capacitor, said switching unit being connected to said control means and operable thereby to selectively permit said capacitor to be charged by said input circuit and to discharge to cause said operational amplifier to provide a reference voltage at the output of said amplifier.

12. The voltage measuring and conversion system of claim 8 in which said reset and ramp gate constitutes a monostable multivibrator which is capable of changing from an initial state of conduction to a second state of conduction upon the reception of an input pulse to simultaneously provide said reset and actuation signals and which automatically returns to said initial state of conduction upon the termination of said input pulse.

13. The voltage measuring and conversional system of claim 4 wherein said counter gate consists of a monostable multivibrator which operates a change from an initial state of conduction to a second state of conduction upon the reception of a start pulse to furnish a potential to initiate the flow of said constant frequency signals to said counting system and which reverts to said initial state of conduction upon the reception of a stop pulse from said second comparison means to terminate the flow of said constant frequency signals, said monostable multivibrator operating to automatically return to said initial state of conduction in the absence of a stop pulse from said second comparison means.

14. In a voltage measuring and conversion system which includes reference voltage generating means and a controlled source of constant frequency signals, a sampling system for causing said measuring and conversion system to execute a predetermined number of measuring cycles comprising:
   (a) control means to initiate the operation of said sampling system,
   (b) pulse producing means connected to said control means, said pulse producing means operating to furnish actuation pulses to said reference voltage generating means,
   (c) a counting and indicating system connected to receive the constant frequency signals from said controlled signal source, and
   (d) a counter unit connected to receive and register each actuation pulse from said pulse producing means, said counter unit operating to send a control signal to terminate the operation of said pulse producing means after a predetermined number of actuation pulses have been received by said reference voltage generating means.

15. In a voltage measuring and conversion system which includes reference voltage generating means and a controlled source of constant frequency signals, a sampling system for causing said measuring and conversion system to execute a predetermined number of measuring cycles comprising:
(a) control means to initiate the operation of said sampling system,
(b) a sampler gate connected to said control means,
(c) a pulse producing sampler connected to said sampler gate and controlled thereby, said sampler operating to provide actuation pulses to said reference voltage generating means,
(d) a counting and indicating system including counting means connected to receive the constant frequency signals from said controlled signal source,
(e) and a counter unit connected to receive and register an indication for each actuation pulse furnished to said reference voltage generating means by said sampler, said counter unit operating to furnish a control signal to said sampler gate after a predetermined number of actuation pulses have been received by said reference voltage generating means, whereby said sampler gate is caused to terminate the operation of said sampler.

16. The sampling system of claim 15 wherein said counting and indicating system includes a control and readout means connected to said counting means, said control and readout means operating to provide an average indication predicated upon the number of constant frequency signals received by said counting means during said measuring cycles.

17. The sampling system of claim 16 wherein the counter unit for registering the actuation pulses furnished to said voltage generating means by said sampler comprises a decade counter which operates to control said sampler gate to cause said sampler to furnish ten actuation pulses to said reference voltage generating means.

18. The sampling system of claim 17 wherein said sampler gate includes a bistable multivibrator which is capable of changing from an initial state of conduction to a second state of conduction under the control of said control means to provide an actuation signal to institute the operation of said sampler, said bistable multivibrator being caused to return to said initial state of conduction by a control signal from said counter unit, whereby the operation of said sampler is terminated.

19. The sampling system of claim 18 wherein said bistable multivibrator is connected to simultaneously provide an actuation signal to said sampler and a reset signal to said counting and indicating system.

20. The sampling system of claim 18 wherein said sampler includes a relaxation oscillator and switching means connected to control the operation of said relaxation oscillator, said switching means receiving the actuation signal from said sampler gate.

21. The sampling system of claim 17 wherein said counting means includes:
(a) an input decade counter connected to receive said constant frequency signals, and
(b) a plurality of decade counters connected in sequence to said input decade counter, said input decade counter and sequentially connected decade counters each including ten output circuits energized in accordance with information stored within said counters, the output circuits of only said sequentially connected decade counters being connected to said readout means, whereby said readout means operates to read out only the information stored in said sequentially connected decade counters while omitting the information stored within said input decade counter to provide an average indication predicated upon the number of constant frequency signals received by said counting means during ten measuring cycles.

22. The sampling system of claim 21 wherein said control and readout means includes:
(a) a relay switching network having a column of relay switches for each said sequentially connected decade counter, each said column containing ten relay switches connected to be operated by the output signal from a single output circuit of one of said decade counters, said switches being electrically interconnected between a power terminal connected to each switching column and an indicator means,
(b) and control means for selectively furnishing power to said switching network, said control means including a stepping switch capable of selectively contacting each of the power terminals connected to said relay switching columns, means to provide the electrical power from a power source to said stepping switch, and means to cause said stepping switch to sequentially contact each of said power terminals, whereby power is selectively provided through said relay contacts to said indicator means.

23. The voltage measuring and conversion system of claim 7 in which said anti-runaway circuit means includes:
(a) a differential detector connected to said first and second comparison means to sense the voltage relationship between said analog, reference and offset voltages in said first and second comparison means, said differential detector operating to provide an output voltage of a given polarity when said analog voltage is equal or greater in value than said reference voltage at the point at which said reference voltage is initiated and to provide an output voltage of the opposite polarity to indicate an abnormal condition when said analog voltage is less than the initial value of said reference voltage,
(b) a polarity detector connected to receive the output from said differential detector, said polarity detector operating to pass only the abnormal condition indicating output signal from said differential detector,
(c) and a control circuit connected to said polarity detector, said control circuit becoming operative upon the reception of a signal from said polarity detector.

24. The measuring and conversion system of claim 23 in which said differential detector comprises an operational amplifier.

25. A voltage measuring and conversion system comprising:
(a) a source of unknown analog voltage,
(b) voltage generating means for generating a substantially linearly increasing reference voltage,
(c) control means connected to institute the operation of said voltage generating means,
(d) means for providing constant frequency signals,
(e) a counting system including counting means connected to receive and count said constant frequency signals,
(f) gating means connected to control the flow of said constant frequency signals to said counting system,
(g) means to provide a predetermined offset voltage opposite in sign to said reference voltage,
(h) first comparison means connected to receive and compare said offset and reference voltages to provide a start pulse to said gating means at a first zero crossing point when the algebraic sum of said offset and reference voltages is equal to zero volts, said first comparison means including a zero crossing detector having an input and an output, said zero crossing detector being capable of providing a start pulse at said output when a voltage zero crossing occurs at said input, a summing point connected to the input of said zero crossing detector and means connecting said summing point to said reference voltage generating means and said offset voltage control means, (i) and second comparison means connected to receive and compare said offset, reference and analog voltages to provide a stop pulse to said gating means at a second zero crossing point when the algebraic sum of said offset, reference and analog voltages is equal to zero volts, said second comparison means including a zero crossing detector having an input and an output, said zero crossing detector being capable of providing a stop pulse at said output when a voltage zero crossing occurs at said input, a summing point connected to the input of said zero crossing detector, and means connecting said summing point to said reference voltage generating means, said offset voltage control means, and said analog voltage source.

26. The voltage measuring and conversion system of claim 25 wherein compensation circuit means is connected to the summing point of said second comparison means, said compensation circuit means operating to provide a variable potential opposite in sign to said analog input voltage to cancel error components present in said analog voltage.

27. The voltage measuring and conversion system of claim 26 wherein an anti-runaway circuit means is connected to said first and second comparison means, said anti-runaway circuit means including:

(a) a differential detector connected to the summing points in said first and second comparison means to sense the voltage relationship between said summing points, said differential detector operating to provide an output voltage of a given polarity under normal operating conditions when said first comparison means is caused to provide a start pulse prior to the creation of a stop pulse by said second comparison means, and to provide an output voltage of opposite polarity to indicate an abnormal operating condition when said second comparison means is caused to provide a stop pulse prior to the initiation of a start pulse by said first comparison means, (b) a polarity detector connected to receive the output from said differential detector, said polarity detector operating to pass only the abnormal condition indicating signal from said differential detector, (c) and a control circuit connected to said polarity detector, said control circuit becoming operative upon the reception of a signal from said polarity detector.

References Cited by the Examiner

UNITED STATES PATENTS 2,791,746   5/1957   Bowersox et al. _____ 340—347
2,897,486   7/1959   Alexander et al. _____ 340—347

DARYL W. COOK, *Acting Primary Examiner.*

MALCOLM A. MORRISON, *Examiner.*

D. M. ROSEN, *Assistant Examiner.*